United States Patent [19]

Hashiguchi et al.

[11] Patent Number: 5,016,130
[45] Date of Patent: May 14, 1991

[54] RETAINING DEVICE FOR A MAGNETIC HEAD

[75] Inventors: Yasuhiro Hashiguchi, Katsuta; Noboru Katohno, Mito; Yoshihiro Shibata, Katsuta, all of Japan

[73] Assignee: Hitachi, Ltd., Tokyo, Japan

[21] Appl. No.: 111,629

[22] Filed: Oct. 23, 1987

[30] Foreign Application Priority Data

Oct. 24, 1986 [JP] Japan ............................ 61-162205[U]

[51] Int. Cl.$^5$ ................................................. G11B 5/48
[52] U.S. Cl. ...................................... 360/104; 360/129
[58] Field of Search ........................ 360/104, 129, 118

[56] References Cited

U.S. PATENT DOCUMENTS

| | | | |
|---|---|---|---|
| 3,767,209 | 2/1971 | Seehawer | 360/104 |
| 4,375,071 | 2/1983 | Crowley et al. | 360/104 |
| 4,586,098 | 4/1986 | Pretto | 360/104 |
| 4,605,978 | 8/1986 | Zeavin | 360/104 |

FOREIGN PATENT DOCUMENTS

| | | | |
|---|---|---|---|
| 0125528 | 9/1980 | Japan | 360/104 |
| 0054669 | 5/1981 | Japan | 360/104 |
| 0094918 | 6/1982 | Japan | 360/104 |
| 0141427 | 8/1983 | Japan | 360/104 |
| 0164015 | 9/1983 | Japan | 360/104 |

OTHER PUBLICATIONS

IBM Technical Disclosure Bulletin, vol. 24, No. 10, Mar. 1982, Magnetic Head Suspension Assembly, Watrous.

*Primary Examiner*—Robert S. Tupper
*Assistant Examiner*—Andreus L. Sniezek
*Attorney, Agent, or Firm*—Antonelli, Terry, Stout & Kraus

[57] ABSTRACT

Grooves are formed on the armor portion of a magnetic head. Elastic pieces having nails for linking to the grooves of the head, and a concave portion for positioning the head are integrally molded with a mounting arm for mounting the head. Linkage of the head to the mounting arm is achieved by the linkage of the elastic pieces to the grooves.

4 Claims, 2 Drawing Sheets

RETAINING DEVICE FOR A MAGNETIC HEAD

BACKGROUND OF THE INVENTION

1. Field of the Invention

The present invention relates to a retaining device for a magnetic head of a home magnetic recording/ reproducing apparatus.

2. Description of the Prior Art

A magnetic video recording/reproducing apparatus for recording and reproducing video signals has a fixed full-width erasing head for erasing signals recorded on a magnetic tape. This magnetic head is usually fixed through a fixing substrate by a fixing screw.

However, use of a screw increases the number of components in the apparatus and at the same time needs the fabrication step of screw clamp, resulting in a drawback of an increased production cost. Attention has not heretofore been paid to reduction of the number of components and reduction of the production cost. As an apparatus of this kind, a related apparatus is described in JP-A-58-164015, for example.

SUMMARY OF THE INVENTION

An object of the present invention is to provide a retaining device for a magnetic head capable of facilitating the linkage between the magnetic head and a mounting member for placing the magnetic head thereon.

In accordance with the present invention, therefore, a groove is formed on a side of a retaining member for retaining a core, a coil etc. of a magnetic head, and a plurality of nails are formed on a mounting member for mounting a magnetic head so as to be linked to the groove of the magnetic head to fix the magnetic to the mounting member.

Owing to the present invention, a full-width magnetic erasing head can be fixed without using a screw or the like on a mounting arm, i.e., by so-called snap fit, resulting in reduction of the number of components and man-hours of production cost.

In case a magnetic head where a groove formed for the purpose of the fabrication, for example, on a retaining device is used, the above described object can be achieved without altering the full-width magnetic erasing head by using the groove for the purpose of fixing. A magnetic head having no grooves can be dealt with simple alteration of only forming a new groove. The present invention is thus applicable to any type of full-width magnetic erasing head to provide it with compatibility.

DESCRIPTION OF THE PREFERRED EMBODIMENTS

Figure 1:
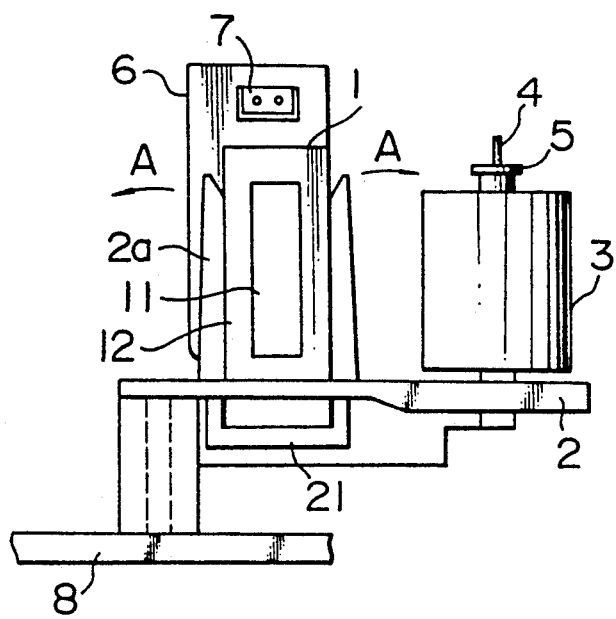
FIG. 1 is a front view of a retaining device of a magnetic head showing an embodiment of the present invention.
Figure 2:
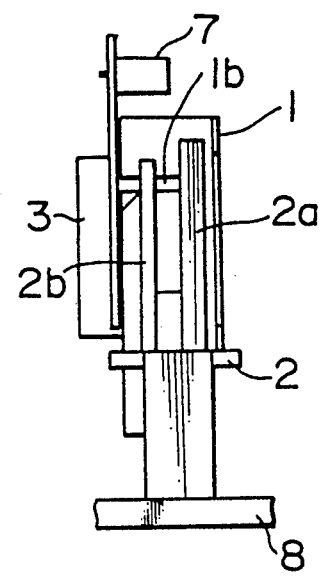
FIG. 2 is a side view of the retaining device illustrated in FIG. 1.
Figure 3:
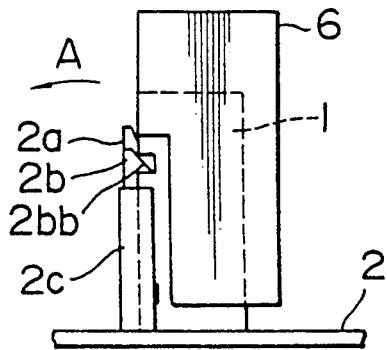
FIG. 3 is a rear view of a primary part of the retaining device illustrated in FIG. 1.
Figure 4:
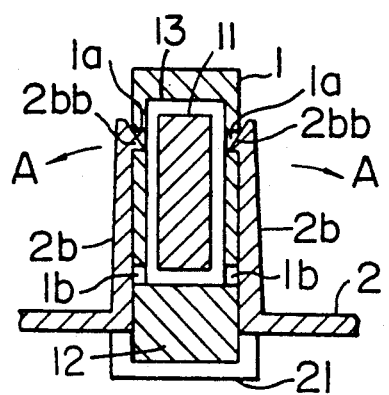
FIG. 4 is a sectional view of a primary part showing the relation between the head and an elastic piece.
Figure 5:
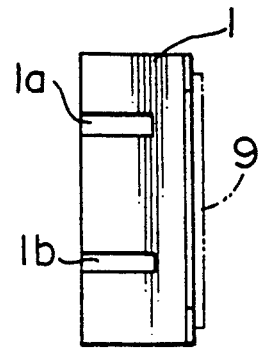
FIG. 5 is a sectional view of the head.
Figure 6:
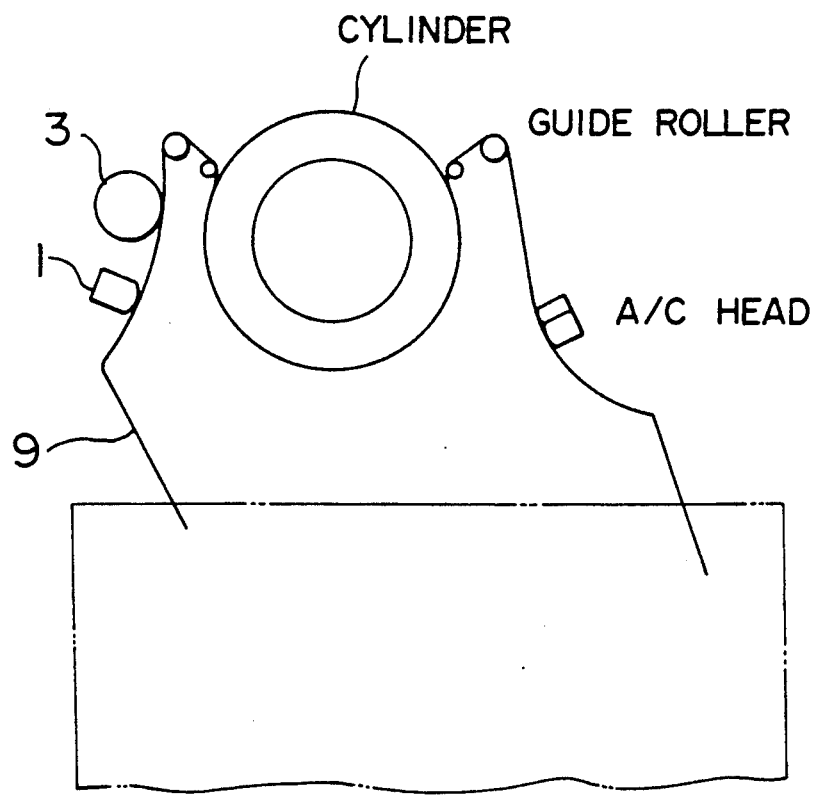
FIG. 6 is a view used for explaining the present invention.

Embodiments of the present invention will now be described by referring to drawings. FIG. 1 is a front view of a retaining device for magnetic head showing an embodiment of the present invention. FIG. 2 is a side view of the retaining device illustrated in FIG. 1. FIG. 3 is a rear view of a principal part of the retaining device illustrated in FIG. 1. In FIGS. 1 to 3, numeral 1 denotes a magnetic head such as an erasing head used in a video tape recorder forming a tape path as, illustrated in FIG. 6. The head 1, as shown in FIG. 4, includes a magnetic core 11 capable of erasing the full width of the tape, a core retaining member 13 for retaining the core, and an armor portion 12 covering the head excepting the tape rubbing face of the core. The core retaining member 13 and the armor portion 12 are integrally molded by using resin. On both side faces of the armor portion 12 of the head 1, upper and lower grooves 1a and 1b formed in parallel as shown in FIGS. 4 and 5 so as to have a width of 1.5 mm, a depth of approximately 1.5 mm and a length of approximately, 4 mm, for example, are arranged. These grooves are formed when the core retaining member 13 and the armor section 12 are integrally molded. Numeral 6 denotes a print-circuit board fixed to the rear face of the head 1, and numeral 7 denotes a plug mounted on the print-circuit board. The print-circuit board 6 and the plug 7 are disposed to connect the head 1 to an erasing circuit (not illustrated). Numeral 2 denotes a head mounting arm for mounting the head 1 thereon. The arm 2 comprises synthetic resin, for example, and is rotatably attached to a chassis 8. As shown in FIGS. 1 to 3, a U-shaped supporting portion 21 for housing, supporting and positioning the head 1, and elastic pieces 2a, 2b and 2c so opposed to side faces and the rear face of the head 1 as to press and hold the head 1 between them are integrally molded with the arm 2. At an edge portion of the elastic piece 2b, a nail 2bb fittable into the grooves 1a and 1b of the armor portion 12 of the head 1 is formed. The head 1 is attached to the arm 2 by bending upper parts of the elastic pieces 2a, 2b and 2c of the arm 2 in a direction indicated by an arrow A and by lightly pressing the head 1 into a concave portion of the supporting portion 21 of the arm 2. By this pressing and the elastic piece 2a, the positioning of the head 1 is performed. The head 1 is prevented from being released from the arm 2 by fitting the nail 2bb of the elastic piece 2b into the grooves 1a and 1b of the head 1. The head 1 is fixed to the arm 2 by the elastic force of the elastic pieces 2a, 2b and 2c.

Numeral 3 denotes an inpedance roller which is rotatably fixed to a shaft 4 erected on the arm 2. The roller 3 is disposed to keep the running of the magnetic tape stable.

In the above described embodiment, a plurality of elastic pieces and grooves are disposed. However, the elastic pieces and grooves may be disposed as occasion demands. In the embodiment, grooves disposed when the head core retaining member and the armor portion are integrally molded are used as the grooves linked to the nails of the elastic pieces. However, grooves for that purpose may be disposed specifically.

claims:

1. A retaining device for a magnetic head in a magnetic recording/reproducing apparatus for recording signals onto magnetic tape and reproducing the signals thus recorded, wherein said magnetic head includes a magnetic core, a core retaining member for retaining said core, and an armor portion integrally molded with said core retaining member, and said magnetic head records signals onto said magnetic tape, and reproduces signals from said magnetic tape or erases signals recorded on said magnetic tape, said retaining device comprising:

- a groove disposed on a side face of said magnetic head where the magnetic head does not contact said magnetic tape, said groove being formed when said core retaining member and said armor portion are integrally molded;
- an elastic piece for mounting said magnetic head to a mounting member made of resin, said elastic piece being disposed and integrally molded on said mounting member;
- wherein said elastic piece includes a nail integral with said elastic piece; and
- wherein said nail is positioned on said elastic piece such that said nail releasably engages said groove to fix said magnetic head to said mounting member.

2. A retaining device according to claim 1 wherein said retaining device is of a concave shape for receiving said magnetic head.

3. A retaining according to claim 2 further comprising a printed circuit board being attached to said magnetic head wherein said printed circuit board has attached thereto circuitry for controlling said magnetic head.

4. A retaining device according to claim 3 wherein said magnetic head includes upper and lower grooves and said retaining device has integral thereon upper and lower nails for releasably engaging said upper and lower grooves respectively.

* * * * *